June 17, 1969  W. H. PRICE  3,449,981
ADJUSTABLE STEERING GEAR
Filed Dec. 12, 1967  Sheet 2 of 3
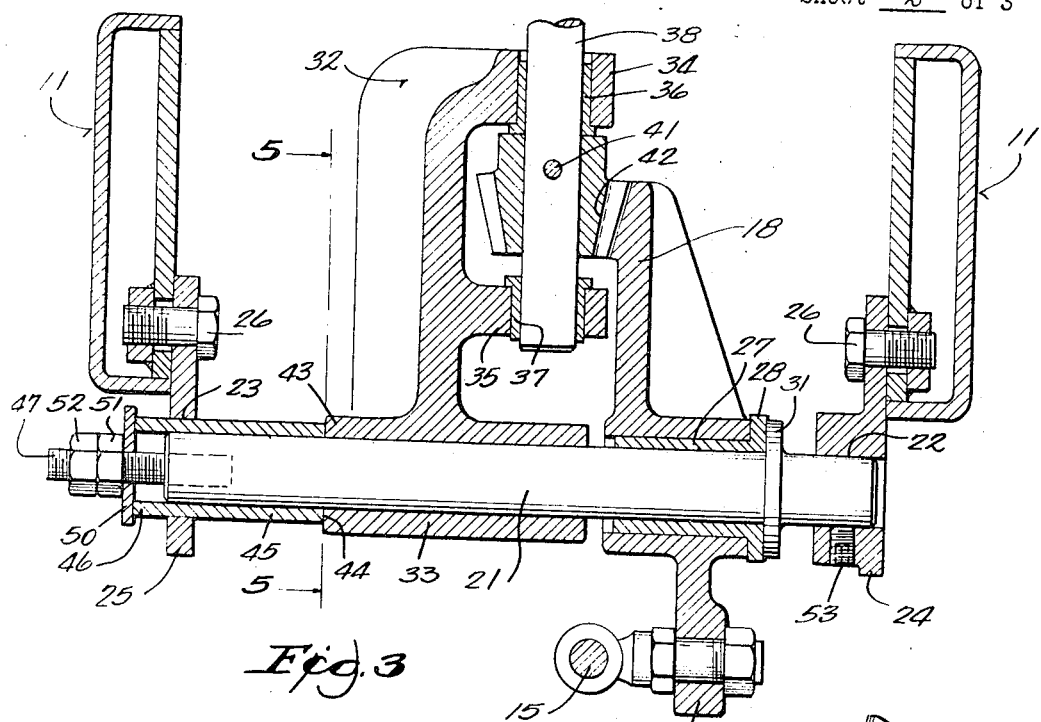
Fig. 3
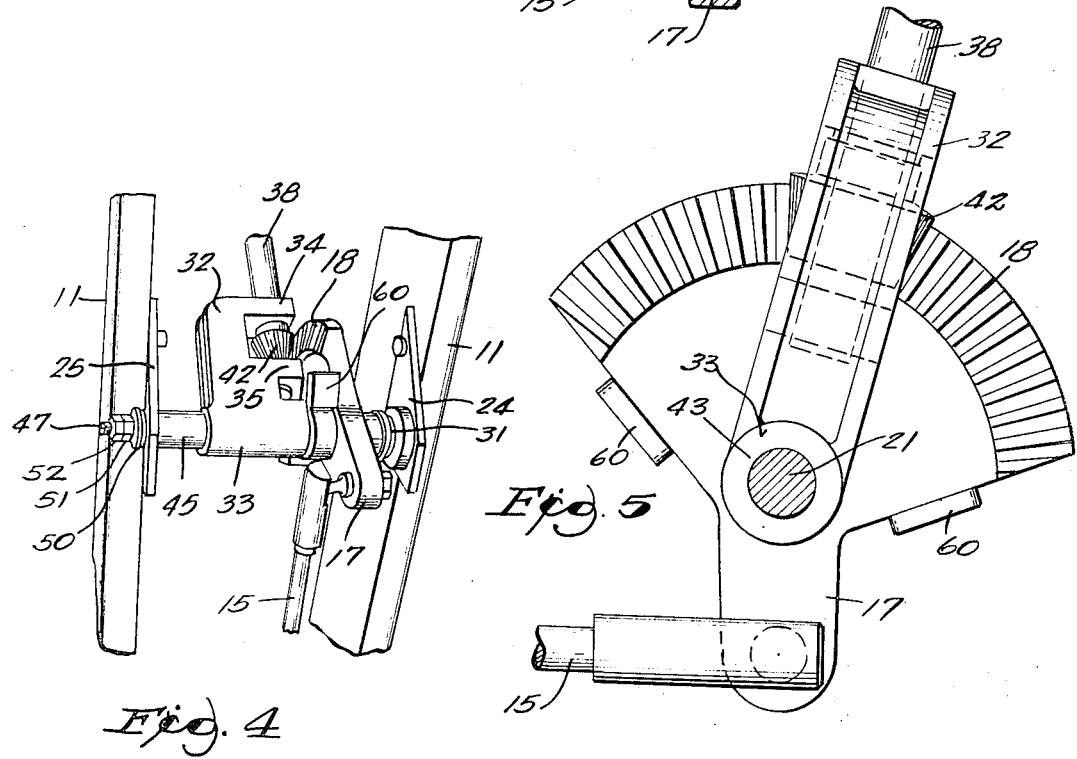
Fig. 4
Fig. 5
INVENTOR
WARREN H. PRICE
BY Wheeler, Wheeler, House & Clemency
ATTORNEYS United States Patent Office 3,449,981
Patented June 17, 1969

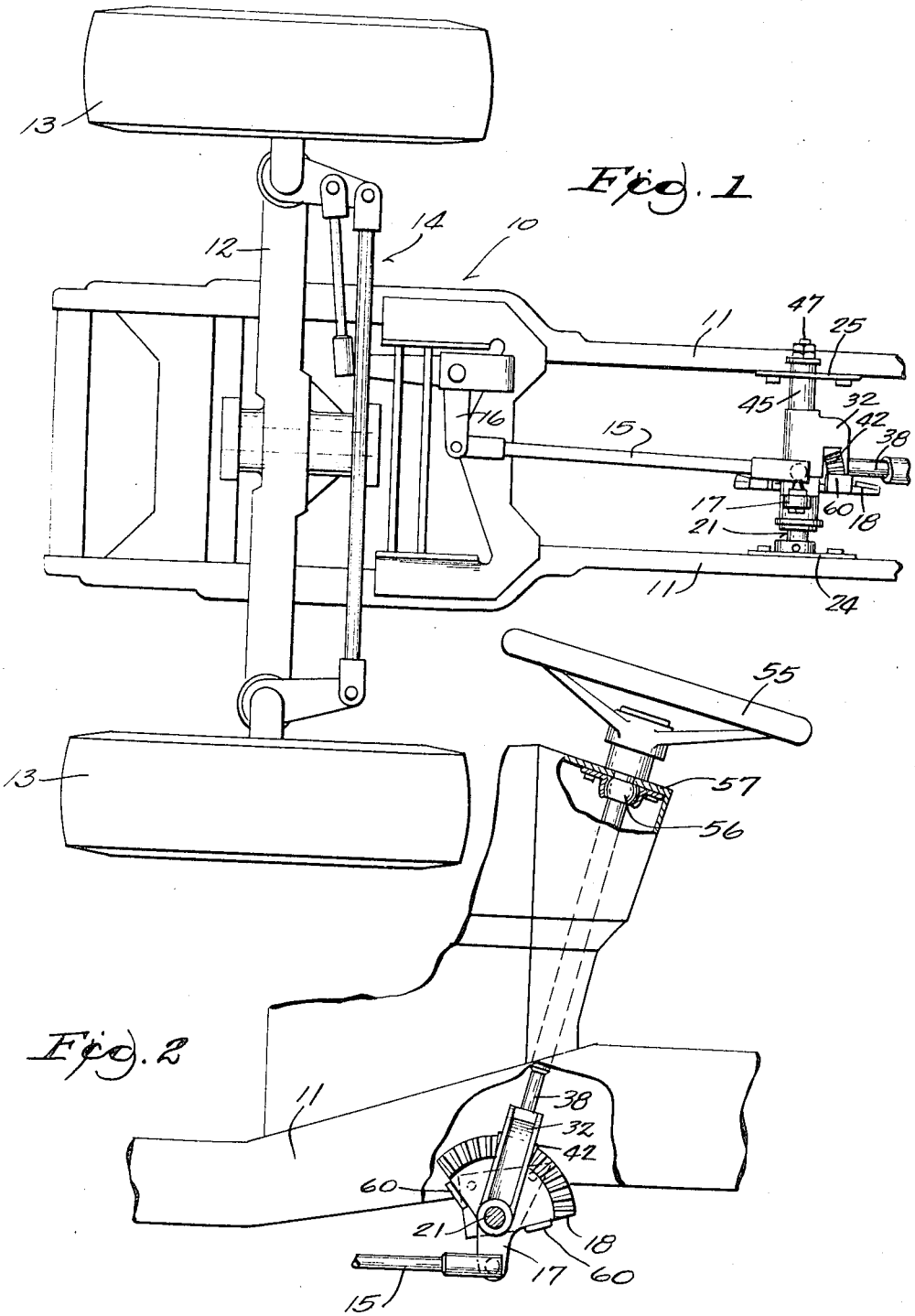

3,449,981
ADJUSTABLE STEERING GEAR
Warren H. Price, Sheboygan, Wis., assignor to Gilson Bros. Co., Plymouth, Wis., a corporation of Wisconsin
Filed Dec. 12, 1967, Ser. No. 689,889
Int. Cl. B62d 1/20, 3/12; F16h 35/08
U.S. Cl. 74—498        8 Claims

ABSTRACT OF THE DISCLOSURE

This disclosure relates to an adjustable steering gear for a wheeled vehicle in which the sector gear and the pinion gear carrier are free to float or shift axially on the axis of the steering gear shaft during assembly. The position of the gears along the shaft axis is set after assembly. At least one of the gears is adjustable after use in order to compensate for gear tooth wear.

Background of the invention

It is conventional for the steering gear on a wheeled vehicle to be mounted on a cross shaft on which the gears have a fixed axial position. Slight variation of part size within manufacturing tolerances and variations in assembly procedures frequently result in some binding between the mesh of the teeth on the sector gear and pinion gear during assembly. Adjustment of the gears after assembly to minimize or eliminate this binding involves complex adjustment procedures with expenditure of considerable time and effort. Moreover, as the vehicle is used, wear between the teeth on the pinion gear and sector gear will gradually result in a sloppy or loose mesh of the gear teeth, again requiring complex adjustment procedures.

Summary of the invention

In accordance with the present invention, the pinion gear carrier and sector gear are permitted to float or shift axially along the axis of the steering gear shaft during the course of assembly of the steering mechanism. The pinion gear carrier and sector gear are also free to rotate about the axis of the steering gear shaft during assembly. Accordingly, the steering gear parts will adjust universally and automatically and will assume a natural position relative to one another, and to the upper bearing on which the steering shaft is mounted on the tractor dashboard, as a result of any stresses induced by assembly procedures and part sized variations, and in which there is no binding between the gear teeth and no binding of the upper bearing. After assembly, the position of the gears along the shaft axis will be set with the gears in proper mesh and without binding.

The invention also provides that, after use, one or the other of the pinion gear carrier and sector gear can be readily adjusted to compensate for wear. This adjustment is readily and simply made without the need for complex procedures.

In one embodiment of the invention, the cross shaft about which the sector gear turns is free during assembly to move axially in its mounting sockets. After assembly, when the shaft has settled in its position in which the gears mesh properly without binding, the shaft position is set by anchoring it in its sockets. In the aforesaid embodiment, the shaft has spaced shoulders against which the sector gear and pinion gear carrier bear axially. One of the these shoulders is shiftable axially along the shaft to adjust the relative axial position of the sector gear and pinion gear carrier after use, thus to compensate for gear tooth wear.

Other objects, features and advantages of the invention will appear from the following disclosure.

Description of the drawings

FIG. 1 is a fragmentary inverted plan view of the front end of a wheeled vehicle showing steerable front wheels, steering gear and linkages interconnecting the steering gear and the wheels.

FIG. 2 is a fragmentary side elevation, partly in cross section, showing the steering shaft connected to the steering gear.

FIG. 3 is an enlarged axial cross section taken through the steering gear cross shaft and steering gears.

FIG. 4 is a perspective view from beneath the tractor showing the steering gear.

FIG. 5 is a fragmentary cross section taken along the line 5—5 of FIG. 3.

Description of the preferred embodiments

Figure 6:
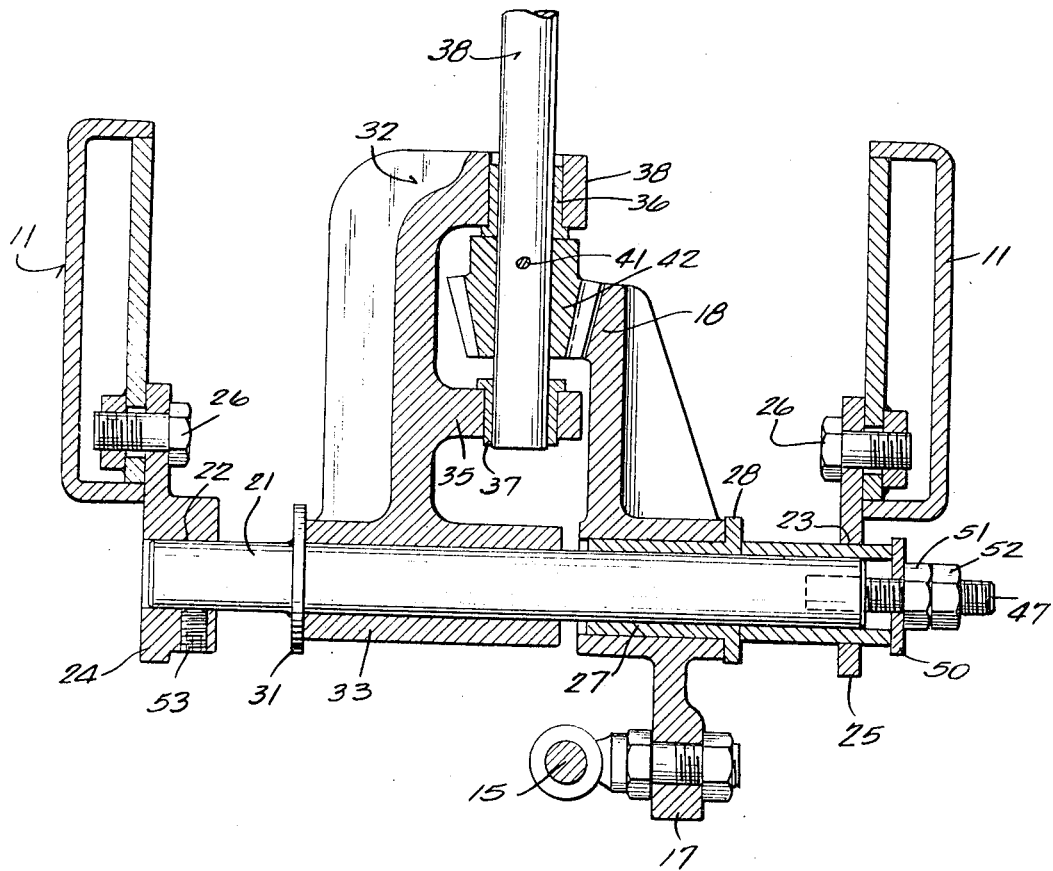
FIG. 6 is a cross section similar to FIG. 3, but showing a modified embodiment of the invention.

Although the disclosure hereof is detailed and exact to enable thosee skilled in the art to practice the invention, the physical embodiments herein disclosed merely exemplify the invention which may be embodied in other specific structure. The scope of the invention is defined in the claims appended hereto.

A tractor of the type shown in my copending United States application Ser. No. 652,567, filed July 11, 1967, has a frame 10 including side beams 11. The frame carries a front axle 12 on which steerable front wheels 13 are mounted. Wheels 13 are conventionally connected by the steering linkage 14 to a thrust rod 15 by which the steering linkage 14 is actuated through the bell crank 16.

Thrust rod 15 is mounted on arm 17 of sector gear 18 which is rotatably mounted on a cross shaft 21. Shaft 21 spans between the frame beams 11 and has its ends mounted in sockets 22, 23 of the steering gear support brackets 24, 25. The brackets 24, 25 are mounted on frame beams 11 by hanger bolts 26.

Sector gear 18 is rotatable about the axis of cross shaft 21 and turns easily on an anti-friction sleeve bearing 27. One end of sleeve 27 is provided with a bearing flange 28 which bears axially against a shoulder 31 formed on the shaft 21, thus to define the position of the sector gear 18 axially along the shaft 21.

Shaft 21 also supports a pinion gear carrier 32 which has an axially bored tube portion 33 through which the shaft 21 extends. Pinion gear carrier 32 has yoke arms 34, 35 suitably bored and provided with anti-friction sleeve bearings 36, 37 for a steering shaft 38. Steering shaft 38 is fixed by cross pin 41 or the like to pinion gear 42 which meshes with sector gear 18, thus to transmit turning motion of the shaft 38 through the pinion gear 42 to sector gear 18, thus to rotate gear 18 about the axis of shaft 21 and push or pull the thrust rod 15, and thus turn the wheels 13.

One end 43 of the pinion gear carrier tube 33 bears against a shoulder 44 at the end of sleeve 45 which is telescoped around the shaft 21 and has an opposite end portion 46 which extends beyond the end of shaft 21. Shaft 21 is provided with an axially extending screw 47. Adjustor means is provided to adjust the axial position of sleeve 45 with respect to shaft 21. This adjustor means includes thrust washer 50, adjusting nut 51, and lock nut 52.

The axial position of the shaft 21 in its sockets 22, 23 is set by setting means which, in the disclosed embodiment, consists of a lock screw 53 which is mounted in a suitable, radial tapped hole in mounting bearing 24.

The upper end of the steering shaft 38 carries a steering wheel 55, or the like. A ball joint 56 provides a universal or swivel mounting of the shaft 38 near its upper end to the vehicle dashboard 57.

During assembly of the steering mechanism, lock screw 53 is loosened so that the cross shaft 21 is free to shift axially in its sockets 22, 23. The pinion gear carrier 32 and sector gear 18 are also free to rotate somewhat about the axis of shaft 21. Accordingly, during assembly, the steering gear mechanism shown in FIG. 3 is free to "float" in response to various stresses imposed thereon. Any slight variations in part size, etc., due to manufacturing tolerances and the like, will not result in any binding of the pinion gear 21 with the sector gear 18 because the parts are free to shift position to relieve any such stresses.

After assembly has been completed and the shaft 21 has found a position within its sockets 22, 23 in which there are no binding stresses on the parts, lock screw 53 is tightened to set or anchor the shaft 21 in its socket 22. Adjusting nut 51 is tightened and locked by nut 52 so that the appropriate pressure is maintained between the shoulders 31 and 44, thus to insure proper meshing pressure between the sector gear 18 and the pinion gear 42.

As the teeth on the gears 18, 42 become worn during use, the meshing pressure will gradually reduce, and a certain amount of slop or looseness in gear mesh will develop. This is readily compensated for simply by re-adjusting the position of sleeve 45 by advancing adjusting nut 51 on screw 47 to re-adjust the meshing engagement of the gears and relocking the sleeve with lock nut 52. If at any time it is desirable to re-adjust the axial position of shaft 21, thus to change the axial position of shoulder 31, this can be done simply by releasing lock screw 53 and allowing the shaft 21 to refloat to a new unstressed position. Retightening of lock screw 53 will reset the parts.

The modification shown in FIG. 6 involves the converse arrangement of the shaft mounting brackets 24, 25 with respect to the side beams 11 of the tractor. The specific parts are the same as previously described and are given the same reference characters. In this embodiment, however, the brackets 24, 25 and shaft 21 are turned end-for-end. Pinion gear carrier 32 has the end of its bearing tube 33 engaged with the fixed shoulder 31 on shaft 21. The sector gear 18 has its bearing flange 28 engaged with the shoulder 44 on the sleeve 45. In this embodiment, after the initial floating adjustment has been made and shaft 21 set in its socket bearings 24, 25, any subsequent adjustment to accommodate for gear tooth wear will not change the position of the steering shaft 38 with respect to ball socket 56 on the dashboard 57. In the embodiment of FIG. 6 all subsequent adjustment involves slight shifting of the sector gear 18. In the embodiment of FIG. 3 subsequent adjustment to correct for mesh involves slight shifting movement of the pinion gear carrier 32.

The sector gear 18 is desirably provided with stops 60. These are aligned for abutment with the pinion gear carrier just before the sector gear 18 loses meshing engagement with the pinion gear 42 at the respective ends of its arc of movement about shaft 21. The stops preclude disengagement of the gears.

Inasmuch as the steering shaft is free for limited universal movement on the center of the universal or ball joint 56, as well as being free for lateral shifting movement along the axis of shaft 21, all such parts coact to facilitate assembly and installation of the steering gear without binding. The universal joint 56 permits the shaft 38 to swing laterally as the gears 18, 42 "float" to their unstressed position, at which position the set screw 53 is tightened.

I claim:
1. In a wheeled vehicle having a steerable wheel, a steering shaft and steering gear which convert the rotation of the steering shaft into steering motion of the wheel, said steering gear comprising a meshing pinion gear and sector gear, and motion transmitting connections from the steering gear to the steerable wheel, the improvement to facilitate the adjustment of said steering gear and comprising:
   a cross shaft about which the sector gear turns,
   a pinion gear carrier mounted on said shaft,
   said sector gear and pinion gear carrier being free to shift along the shaft axis during assembly of the steering gear to relieve any gear binding which might occur during assembly,
   and setting means for setting the axial position of the sector gear and pinion gear carrier after assembly to achieve proper gear mesh.

2. The invention of claim 1 in combination with means for adjusting the relative positions of the sector gear and pinion gear carrier after use, to compensate for wear.

3. The invention of claim 1 in which the vehicle has mounting sockets in which the cross shaft is adjustable axially, said shaft having spaced shoulders against which said sector gear and pinion gear carrier seat axially, said setting means comprising means for releasably locking the axial position of the shaft in its sockets.

4. The invention of claim 3 in which one of said shoulders is shiftable axially along the shaft to adjust the relative axial position of the sector gear and pinion gear carrier after use and compensate for wear.

5. The invention of claim 4 in which the adjustable shoulder comprises a sleeve about said shaft and adjustor means for moving the sleeve along the shaft.

6. The invention of claim 5 in which the adjustor means comprises a screw projecting axially from the shaft, a thrust washer about the screw and engaged with the sleeve and a nut movable along the screw to press the washer against the sleeve.

7. The invention of claim 1 in which the steering shaft has its lower end connected to said steering gear, its upper end being attached to the vehicle on an upper bearing with which the steering shaft will align without binding when the steering gear has shifted axially to an aligned position with the upper bearing.

8. The invention of claim 7 in which said upper bearing comprises a universal joint.

References Cited

UNITED STATES PATENTS 1,473,691 11/1923 Young.
2,181,424 11/1939 Glacy et al. _____ 74—400

MILTON KAUFMAN, *Primary Examiner.*

U.S. Cl. X.R.

74—400; 280—96